May 5, 1970    R. W. NEW    3,509,979
COIN CONTROL SYSTEM FOR A LIQUID DISPENSING MACHINE
Filed Jan. 25, 1968    2 Sheets-Sheet 1

Russel W. New
INVENTOR

BY
Browning, Hyer, Eickenroht & Thompson
ATTORNEYS

Russel W. New
INVENTOR

United States Patent Office
3,509,979
Patented May 5, 1970

3,509,979
COIN CONTROL SYSTEM FOR A LIQUID DISPENSING MACHINE
Russel W. New, Dallas, Tex., assignor to Meter-All Mfg. Co., Inc., Dallas, Tex., a corporation of Texas
Filed Jan. 25, 1968, Ser. No. 700,415
Int. Cl. G07f 15/00
U.S. Cl. 194—13        8 Claims

ABSTRACT OF THE DISCLOSURE

A control system is disclosed for unattended liquid dispensing machines, such as coin-operated gasoline pumps. The deposit of a coin actuates a stepper one or more times, depending upon the denomination of the coin, to establish a credit in the system. Establishing a credit connects power to the system. The system includes switches to supply power to the pump motor that are actuated by the purchaser, usually when he takes the hose nozzle from its support on the pump. As liquid is dispensed, its quantity is measured and for each amount dispensed that is the monetary equivalent of a unit of credit, a credit erasing stepper is actuated to remove one unit of credit from the system. If the purchaser does not take all of the liquid he purchased, a pulsing circuit is provided in the system to actuate the credit erasing stepper a sufficient number of times to clear the system of credit and turn off the power, when the purchaser turns off the power to the pump, usually, by hanging up the hose. If the purchaser does not take all of his purchase and fails to turn off the power to the pump as for example, by failing to hang up the hose, a timer will energize the pulsing circuit after a given period of time, remove the credit, and cut off power to the system.

---

This invention relates generally to control systems for unattended liquid dispensing machines and, in particular, to such machines that dispense varying quantities of liquid, such as coin-operated gasoline pumps.

Unattended liquid dispensing machines, such as coin-operated soft drink machines, dispense the same amount of liquid each time coins of a preselected monetary value are deposited in the machine. In other types of unattended liquid dispensing machines, however, such as coin-operated gasoline pumps, the purchaser will buy varying amounts. A control system for such a machine is described in U.S. Pat. No. 2,573,112, which issued Oct. 30, 1957 to P. M. Schneckenburger. With such a system, the purchaser can purchase one or more units of credit by depositing one or more coins equal in value to the unit of credit available. For example, the control system can sell ten cent, twenty-five cent, etc., units of credit. Thus, the purchaser can buy a minimum amount of gasoline, say twenty-five cents worth or several dollars worth. The credit is erased as the gasoline is dispensed by the pump. The control system shuts down the liquid dispensing apparatus of the pump, when all of the units of credit are removed from the system.

With this type control system, a purchaser may leave a credit in the system. For example, he may purchase more gasoline than his tank will hold. This would work to the benefit of the next customer, of course, and really is no detriment to the station owner, since he has been paid for the gasoline. The problem with unused credit in the gasoline pump control system is one of safety.

Gasoline is a dangerous liquid. At an unattended gasoline station, no one is around to keep children playing in the area from pumping the purchased gasoline left in the pump onto the ground or themselves. It would be a particularly dangerous situation, should the purchaser fail to shut off the pump and leave the hose and nozzle lying on the ground with pump pressure on it.

It is an object of this invention to provide a control system for unattended liquid dispensing machines that will permit the purchaser to buy varying amounts of liquid, but which will remove any unused credit the purchaser leaves in the control system.

It is another object of this invention to provide a control system for unattended liquid dispensing machines that will remove any unused credit in the control system after a given period of time.

It is yet another object of this invention to provide a control system for unattended liquid dispensing machines that will remove any unused credit in the control system, when the purchaser hangs up the hose and nozzle and shuts off the pump.

These and other objects, advantages, and features of this invention will be apparent to those skilled in the art from a consideration of this specification, including the appended claims and attached drawings.

Figure 1:
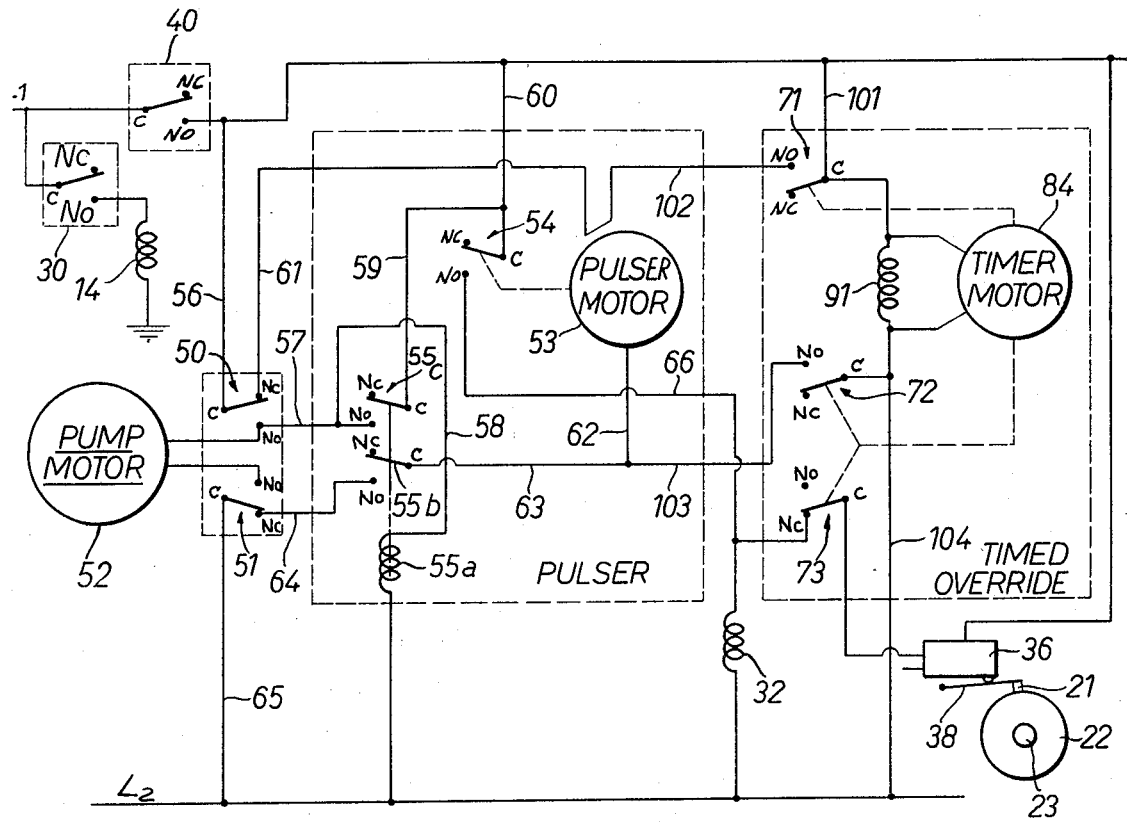
Figure 2:
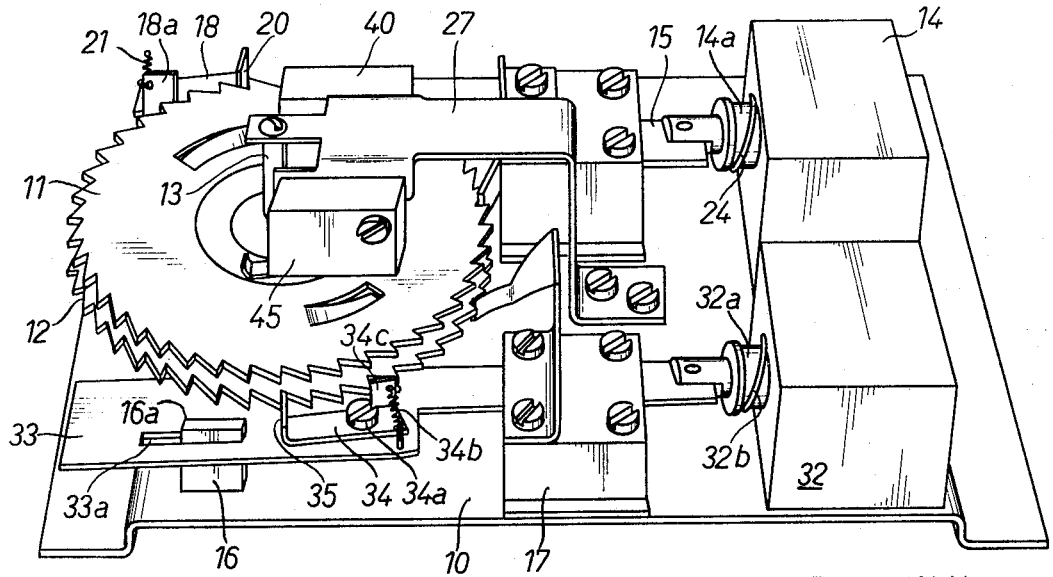
Figure 3:
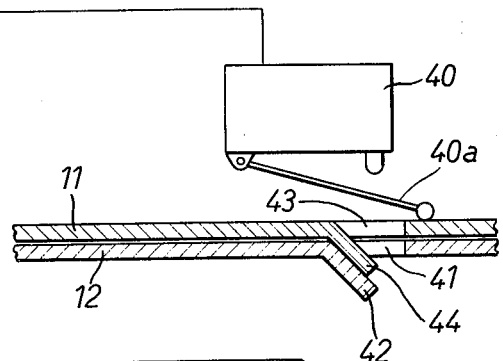
Figure 4:
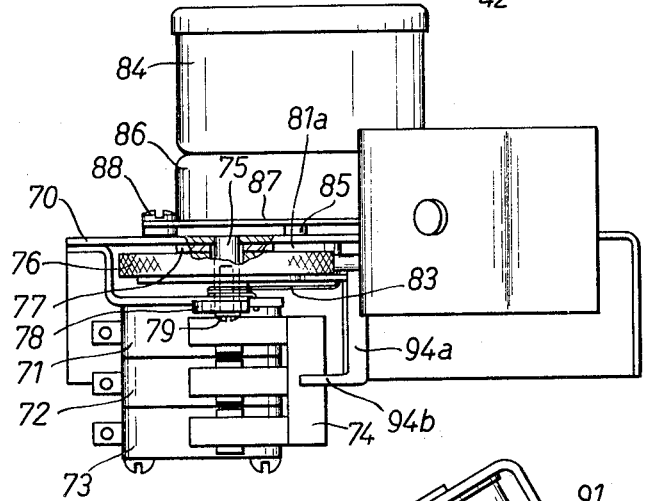
Figure 5:
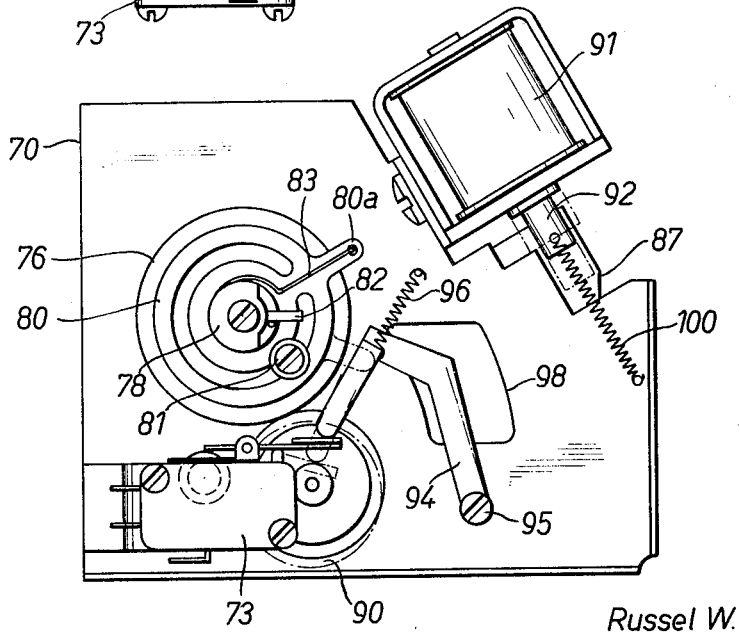

In the drawings:
FIG. 1 is a circuit diagram of the preferred embodiment of the control system of this invention;
FIG. 2 is an isometric view of the credit establishing and credit erasing apparatus employed in the control system of FIG. 1;
FIG. 3 is a fragmentary view of a portion of the apparatus of FIG. 2 along with the switch this apparatus actuates to provide power to the control system;
FIG. 4 is a top view of the override apparatus employed in the control system to remove credit from the system after a given period of time; and
FIG. 5 is a front view of the timed override apparatus of FIG. 4.

The control system will be described in connection with a coin-operated gasoline pump. The system includes means for establishing a unit of credit for each coin of a given denomination deposited by the purchaser and erasing a unit of credit from the system when that amount of gasoline is delivered. For purposes of this description, assume the unit of credit is two bits (twenty-five cents).

Referring now to FIGS. 1 and 2, the operation of the credit establishing and credit erasing apparatus employed in the preferred embodiment of the invention will be described. The apparatus includes a credit member and a debit member. The credit member comprises ratchet wheel 11 and the debit member comprises ratchet wheel 12. The ratchet wheels are mounted on shaft 13 for rotation in parallel planes and in the same direction around the common axis of the shaft. Credit wheel 11 is free to move up and down along the shaft toward and away from debit wheel 12. The upper end of shaft 13 is supported by bracket 27 and bushings (not shown) are located on the shaft below ratchet wheel 12 to hold it and ratchet wheel 11 above mounting plate 10.

Solenoid 14 has its movable core or armature 14a connected to pawl plate 15. This pawl plate is arranged in the same manner as is pawl plate 33, which is connected to armature 32a of solenoid 32; therefore, only pawl plate 33 and its associated members will be described in detail.

Pawl plate 33 is supported on guide block 16 for movement parallel to a tangent to debit wheel 12. It is guided for this movement by key 16a, which is attached to block 16 and extends through slot 33a in the pawl plate. It also is guided in its travel by a slot in guide block 17, through which the plate extends. Pawl 34 is mounted on plate 33 by mounting screw 34a, around which the pawl can rotate. The pawl has a front lug 35 that is held in position to engage the teeth of ratchet wheel 12 by coil spring 34b, which extends between a post on plate 33 and rear lug 34c. Thus, when solenoid 32 is energized it will retract armature 32a against coil spring 32b, pull the pawl plate longitudinally to the end of its travel as allowed by slot 33a. Pawl 34 will ratchet over one or more teeth on debit wheel 12. When solenoid 32 is de-energized, spring 32b will move armature 32a to the position shown in FIGURE 2, causing lug 35 on pawl 34 to move debit wheel 12 an incremental distance in a clockwise direction, as viewed in FIGURE 2. This may be one tooth or more than one tooth, as desired. After which, rear lug 34c engages a tooth and prevents overthrow of the ratchet wheel. Usually, one tooth is the movement obtained. In the same manner, pawl 18 is pivotally mounted on the end of pawl plate 15 by a mounting screw, which is not shown in the drawings. This pawl has a front lug 20 that is held in position to engage the teeth of ratchet wheel 11 by coil spring 21, which is attached to rear lug 18a on the pawl. With this arrangement, as plate 15 is moved toward the solenoid by armature 14a, when the solenoid is energized, lug 20 engages a tooth on ratchet wheel 11 and rotates the wheel an incremental distance after which rear lug 18a engages a tooth and prevents overthrow. When the solenoid is de-energized, solenoid spring 24 returns the armature, the plate, and the pawl to the position shown in FIGURE 2. As the plate returns to the position shown, the pawl 18 will rotate around its mounting screw to allow lug 20 to move past one or more teeth on the ratchet wheel and back into position for moving the wheel another incremental distance. For a more detailed description of this apparatus, see my co-pending application Ser. No. 622,322 filed Mar. 10, 1967 and entitled "Control Device for Liquid Dispensing Machines."

Debit solenoid 32 is connected to switch 36 through switch 73, as shown in FIGURE 1. This switch is actuated by actuator 38 each time the actuator is engaged by projection 21 on cam wheel 22. The cam wheel is mounted for rotation with shaft 23, which is driven by the computer or counter (not shown) associated with the gasoline pump to indicate the monetary value of the gasoline dispensed. Since, usually, the output shaft of the computer rotates one time for each ten cents worth of gasoline dispensed, shaft 23 can be connected directly to the output shaft of the computer and switch 36 will be actuated for each ten cents worth of gasoline sold. The control system shown is arranged to sell gasoline in twenty-five cent quantities, however, so a two and one half to one gear reduction (not shown) is installed between shaft 23 and the output shaft of the computer so that the output shaft of the computer will rotate two and one half times for each revolution of cam shaft 23. Thus, each time switch 36 is actuated, it supplies power to solenoid 32, which retracts pawl plate 33. When switch 36 is opened solenoid 32 is de-energized allowing pawl 34 to move debit wheel 12 one incremental distance. This removes one unit of credit from the system in the manner to be described below.

In the control system, means are provided for controlling the supply of power to the liquid dispensing apparatus of the liquid dispensing machine being controlled to permit said apparatus to dispense liquid as long as a credit is established in the system and to stop said apparatus from dispensing liquid when all the credit has been removed from the system. In the embodiment shown, switch 40 is mounted on bracket 27 over credit wheel 11, with switch arm 40a, as shown in FIG. 3, engaging credit wheel 11. Debit wheel 12 has opening 41 formed therein by bending tab 42 downwardly out of the plane of the ratchet wheel at an angle of about 45°. Credit wheel 11 has a similar opening 43 formed in the same manner by bending tab 44 downwardly out of the plane of the wheel at an angle of about 45°. Tabs 42 and 44 are located radially the same distance from the center of rotation of the wheel so that when the wheels are positioned as shown in FIG. 3, tab 44 will extend through opening 41 and the credit wheel rests on the debit wheel.

In this position, switch 40 is open. With the deposit of a coin, coin-operated switch 30 (FIG. 1) is closed energizing credit solenoid 14. This moves credit wheel 11 an incremental distance to the left as viewed in FIG. 3. For the wheel to move this incremental distance, tab 44 will have to ride up the inclined surface of tab 42, which causes the wheels to move apart. This upward movement of wheel 11 moves switch arm 40a up far enough to close switch 40, thereby connecting the control system of FIG. 1 to hot line $L_1$.

Additional quarters can be deposited to establish additional units of credit in the system and each twenty-five cents deposited will move tab 44 of the credit wheel further from opening 41 in the debit wheel.

Usually, two switches are arranged to be actuated by the ratchet wheels. One functions as switch 40 described above. The other switch, switch 45 in the drawings, controls a flow restricting device to slow down the rate of discharge of gasoline from the pump when only one unit of credit remains. The actuation of this switch removes the flow restriction when two credits have been established.

As liquid is dispensed by the purchaser, switch 36 will energize solenoid 32 for each twenty-five cents worth of gasoline dispensed. Each time solenoid 32 is de-energized, it will move debit wheel 12 in the same direction as credit wheel 11 was moved, when the credit was established.

When the debit wheel has been moved the same number of incremental distances as the credit wheel was moved, when the credit was established, tab 44 will fall back through opening 41 to the position shown in FIGURE 3, opening switch 40 and interrupting the supply of power to the control system.

Referring now to FIGURE 1, when a credit has been established in the system by the actuation of solenoid 14, switch 40 will be closed as described above connecting the common contact of switch 50 to hot line $L_1$. Switch 50 and switch 51, the latter of which has its common contact connected to $L_2$, the ground side of the circuit, are the pump switches which are actuated by the purchaser, either when he removes the hose nozzle from the pump or by actuation of a separate manually-operated pump switch. In either event, closing switches 50 and 51 by the purchaser connects pump motor 52 across lines $L_1$ and $L_2$ and provides the pump motor with power to deliver gasoline, under pressure, to the hose nozzle. The purchaser, of course, controls the flow of gasoline from the pump in the conventional manner by operation of the nozzle on the end of the hose. After the gasoline pump has dispensed all of the gasoline bought by the purchaser all of the credit will be removed from the control system and power to the pump motor will be cut off by the opening of switch 40, as the credit wheel drops down on top of the debit wheel, as described above. The purchaser then will hang up the hose nozzle and the control system will be ready for the next purchaser.

If for some reason the purchaser does not remove all of the credit from the control system, switch 40 will remain closed. Therefore, means are provided to remove any credit left in the system by the purchaser, when the purchaser hangs up the hose and cuts off power to pump motor 52. As stated above, this can be done by the actual hanging up of the hose nozzle or by a separate manually operated switch on the side of the pump.

In the embodiment shown, the means for removing any credit left in the system after the purchaser hangs up the hose nozzle and turns off the pump includes pulser motor 53 and pulsing switch 54 both of which are located in the portion of the circuit designated "pulser." The pulser also includes a relay comprising switches 55b and 55c and coil 55a.

When the purchaser turns on the pump, closing switches 50 and 51, relay coil 55a is energized through lines 56, 57, and 58. This closes normally open switches 55b and 55c and locks coil 55a between L₁ and L₂ through line 58, switch 55c, lines 59 and 60. If the purchaser opens pump switches 50 and 51 with credit remaining in the control system, pulser motor 53 will be connected across lines L₁ and L₂ by lines 56, 61, 62, 63, 64 and 65, and switches 50, 56, and 51. Pulser motor 53 actuates pulsing switch 54, intermittently energizing solenoid 32 through lines 60 and 66. The pulsing motor and pulsing switch 54 will continue to intermittently energize debit solenoid 32 until all of the credit has been removed from the system. This will open switch 40 and the control system will return to the conditions shown in FIGURE 1.

If for some reason, the customer should leave credit in the control system and not turn off power to the pump so the pulser can remove the credit, means are provided to remove the credit after a given period of time has elapsed. The apparatus to accomplish this is shown in FIGURES 4 and 5 and is designated in the circuit of FIGURE 1 as a "Timed Override."

Referring first to FIGURES 4 and 5, the apparatus includes mounting plate 70 upon which are mounted switches 71, 72, and 73. Actuator bar 74 extends across the top of the actuator arms of the switches so that pressure on the actautor bar will actuate all three switches. Timing wheel 76 is mounted for rotation on shaft 75, which extends out from mounting plate 70. Washer 77 spaces the timing wheel away from the mounting plate. Bushing 78 is located on shaft 75 on the other side of the timing wheel from washer 77. It is held on shaft 75 by machine screw 79. Bushing 78 is fixed on the shaft so that it will not rotate with timing wheel 76.

Mounted on the side of the timing wheel between bushing 78 and the timing wheel is adjustable timer plate 80. This timer plate is movable relative to the timing wheel and shaft so that the position of arm 80a can be adjusted. When in the desired position machine screw 81 can be tightened to fix the plate to the timing wheel. Bushing 78 is provided with pin 82 to which one end of coil spring 83 is attached. The other end of the spring is attached to arm 80a on the timer wheel plate. The spring itself is wrapped around bushing 78 so as to resist the movement of arm 80a by the timer wheel in a clockwise direction, as viewed in FIGURE 5. A pin (not shown) attached to the timer wheel limits the rotation of the timer wheel in a counterclockwise direction by engaging tab 81a bent out of plate 70.

Timer motor 84 is provided to rotate timer wheel 76 in a clockwise direction. The timer motor drives shaft 85 through speed reduction unit 86. The motor and the speed reduction unit are both mounted on plate 87. Plate 87 is attached to mounting plate 70 by mounting screw 88 around which the plate can pivot in a plane parallel to mounting plate 70. Output shaft 85 extends through a large opening (not shown) in mounting plate 70 and rotates drive wheel 90. The drive wheel is located in substantially the same plate as timing wheel 76 so that their peripheral edges can be moved into and out of engagement by pivoting plate 87 around mounting screw 88. Solenoid 91 is provided to so move plate 87. The solenoid has its armature 92 connected to plate 87, as shown in FIGURE 5. The solenoid itself is mounted on mounting plate 70. Thus, when the solenoid is energized, it will pivot plate 70 around mounting screw 88 and bring the peripheral edge of drive wheel 90 into firm engagement with the peripheral edge of timer wheel 76. Preferably, the peripheral surface of the drive wheel is coated with rubber and the peripheral edge of the timer wheel is knurled to increase the frictional forces between the two wheels.

Switch actuator arm 94 is pivotally mounted on mounting plate 70 by mounting screw 95. It has a portion 94a, which extends outwardly from the arm in the path of timer plate arm 80a as the arm is rotated in a clockwise direction by the timer wheel. It also has portion 94b positioned to engage actuator bar 74 of switches 71, 72, and 73.

In operation then power is provided to solenoid 91 and timer motor 84, when a credit is established in the system. The solenoid moves drive wheel 90 into engagement with the timer wheel and the motor begins to rotate timer wheel 76. Arm 80a on the timing wheel plate is moved clockwise with the timer wheel and will engage portion 94a of the switch actuator and move the arm downwardly for portion 94b to actuate switches 71, 72, and 73 if credit still remains in the system after a pre-selected period of time. If all of the credit is removed before that time, solenoid 91 will be de-energized and the drive wheel will be moved out of engagement with the timer wheel, allowing spring 83 to return the wheel to its initial position.

The length of time required for arm 80a to move downwardly and engage portion 94a of the switch actuator arm and actuate switches 71, 72 and 73 is adjustable. It can be adjusted by changing the position of timing wheel plate 80, so as to position arm 80a varying distances from the switch actuator arm. As shown, the time required to move arm 80a down and trip the switches is about five minutes. This results from a timer motor that operates at about three revolutions a minute and a speed reducer having a speed reduction of 30:1. The drive wheel then rotates one revolution every 10 minutes. The ratio of the diameters of the drive wheel and the timer wheel causes the timer wheel to rotate one revolution every 15 minutes. With such a drive arrangement, arm 80a will move through 72°, about the angular movement required for the arm in the drawings, in about five minutes.

Therefore, should the purchaser leave credit in the system and fail to turn off the pump, power will remain in the system and timer motor 84 will move arm 80a downwardly far enough to actuate switches 71, 72, and 73 in about five minutes. Closing switches 71 and 72 provides pulser motor 53 with power through lines 101, 102, 62, 103, and 104. The pulser motor then actuates pulsing switch 54 and removes credit from the system in the manner described above by intermittently energizing solenoid 32 until all credit is removed. When this occurs, switch 40 will open and power will be cut off to the system. This de-energizes solenoid 91 allowing drive wheel 90 to move out of engagement with the timer wheel and the timer wheel will be returned to its original position by spring 83. Spring 96 will then rotate arm 94 clockwise returning switches 71, 72 and 73 to the position shown in FIGURE 1.

Switch 73 is included in the timer override to eliminate any possibility of cam operated switch 36 interfering with the removal of credit from the system. For example, the customer may stop taking gasoline when cam 22 is in the position shown in FIGURE 1, with projection 21 holding the switch closed. This means that power will be continuously supplied to credit erase solenoid 32. As explained above, this stepper moves debit wheel 12 forward when the solenoid is de-energized and pulls pawl 34 back to get another bite when it is energized. Therefore, in order to remove credit there has to be alternating energization and de-energization of the solenoid, which could not happen if switch 36 is held closed. For this reason, switch 73 is placed in the timed override to open the circuit between cam operated switch 36 and debit solenoid 32, when the timed override is actuated. This insures that the pulser can intermittently energize debit solenoid 32 and remove any remaining credit.

If switch 36 is closed when the purchaser stops taking gasoline and he opens the pump switches, the pulser will not be able to clear the system of credit until the timed override opens switch 73 for the reasons explained above. Therefore, this switch is important to both credit removing means.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A control system for a liquid dispensing machine having power operated liquid dispensing apparatus, said control system including means for establishing credit in the system, means for controlling the supply of power to the liquid dispensing apparatus to permit said apparatus to dispense liquid as long as a credit is established in the system and to stop said apparatus from dispensing liquid when all of the credit has been removed from the system, means for erasing the credit from the system when a quantity of liquid has been dispensed having a monetary value equal to the credit, means for actuating the credit erasing means to remove any unused credit left in the system by the purchaser after a given period of time has lapsed, means operated by the purchaser for connecting and disconnecting the liquid dispensing apparatus of the machine to the system to connect and disconnect the liquid dispensing apparatus to a source of power and means for actuating the credit erasing means when the purchaser disconnects the liquid dispensing apparatus of the machine from the system before the machine has dispensed a quantity of liquid equal to the quantity purchased.

2. A control system for a liquid dispensing machine having power operated liquid dispensing apparatus operated by the purchaser, said control system including means for establishing credit in the system, means for connecting the system to a source of power when credit is established in the system and for disconnecting the system from the source of power when all of the credit has been removed from the system, means operated by the purchaser for connecting and disconnecting the liquid dispensing apparatus of the machine to the system to connect and disconnect the liquid dispensing apparatus to the source of power, means for erasing the credit from the system when a quantity of liquid has been dispensed having a monetary value equal to the credit and means for actuating the credit erasing means to remove any unused credit left in the system when the purchaser disconnects the liquid dispensing apparatus from the system.

3. The control system of claim 2 further provided with means for actuating the credit erasing means after a given period of time has elapsed and credit remains in the system.

4. A control system for a liquid dispensing machine having power operated liquid dispensing apparatus comprising means for establishing units of credit in the system equal to the quantity of liquid purchased, first switch means for connecting the system to a source of power when one unit of credit is established in the system and for disconnecting the system from said power source when all credit is removed from the system, second switch means actuated by the purchaser for connecting the system to the liquid dispensing apparatus to provide said apparatus with power to dispense the liquid purchased and to disconnect said apparatus from the system, means for erasing a unit of credit from the system each time it is actuated, means for actuating the credit erasing means for each quantity of liquid dispensed having a monetary value equal to one unit of credit, and means for automatically actuating the credit erasing means a sufficient number of times to remove any unused credit left in the system by the purchaser when the purchaser disconnects the liquid dispensing apparatus from the system after dispensing some but not all of the quantity of liquid purchased.

5. The control system of claim 4 further provided with means for actuating the means for actuating the credit erasing means to remove any unused credit left in the system after the credit has been left in the system a preselected period of time.

6. The control system of claim 4 in which the means for establishing units of credit in, and removing such units from, the system includes first and second steppers, a coin-operated switch for actuating the first stepper for each coin of a given denomination deposited to establish a unit of credit in the system, switch means for actuating the second stepper for each volume of liquid dispensed having a value equal to said coin to remove a unit of credit from the system, and in which the means for automatically actuating the credit erasing means includes a pulser having a switch and means for intermittently actuating the switch to intermittently actuate the second stepper to remove credit from the system when the purchaser disconnects the liquid dispensing apparatus from the system.

7. The control system of claim 6 further provided with a timed override comprising means for actuating said pulser after a preselected period of time has elapsed since a credit was established in the system.

8. The control system of claim 7 in which the timed override includes means for disconnecting the second stepper from the switch means for actuating the second stepper for each given volume of liquid dispensed to keep said switch means from affecting the operation of the pulser.

References Cited

UNITED STATES PATENTS

| 2,166,618 | 7/1939 | Williams | 222—33 |
|---|---|---|---|
| 2,564,015 | 8/1951 | Lillig. | |
| 2,573,112 | 10/1951 | Schneckenburger. | |

SAMUEL F. COLEMAN, Primary Examiner

U.S. Cl. X.R.

222—2